(12) United States Patent
Rajendra et al.

(10) Patent No.: US 12,202,943 B2
(45) Date of Patent: Jan. 21, 2025

(54) ELECTROSTATICALLY DISSIPATIVE ROOM TEMPERATURE VULCANIZABLE SILICONE

(71) Applicant: Momentive Performance Materials Inc., Waterford, NY (US)

(72) Inventors: Vinodh Rajendra, Waterford, NY (US); Isao Iida, Gunma (JP); Tetsuo Fujimoto, Gunma (JP); Ramasubramanian Narayanan, Bangalore (IN)

(73) Assignee: Momentive Performance Materials Inc., Niskayuna, NY (US)

( * ) Notice: Subject to any disclaimer, the term of this patent is extended or adjusted under 35 U.S.C. 154(b) by 616 days.

(21) Appl. No.: 17/299,127

(22) PCT Filed: Dec. 3, 2019

(86) PCT No.: PCT/US2019/064098
§ 371 (c)(1),
(2) Date: Jun. 2, 2021

(87) PCT Pub. No.: WO2020/117719
PCT Pub. Date: Jun. 11, 2020

(65) Prior Publication Data
US 2022/0098370 A1 Mar. 31, 2022

(51) Int. Cl.
| | | |
|---|---|---|
| *C08G 77/16* | (2006.01) |
| *C08G 77/00* | (2006.01) |
| *C08G 77/18* | (2006.01) |
| *C08K 3/22* | (2006.01) |
| *C08K 5/54* | (2006.01) |
| *C08K 9/02* | (2006.01) |

(52) U.S. Cl.
CPC ............ *C08G 77/16* (2013.01); *C08G 77/18* (2013.01); *C08G 77/70* (2013.01); *C08K 3/22* (2013.01); *C08K 5/54* (2013.01); *C08K 9/02* (2013.01); *C08K 2003/2241* (2013.01); *C08K 2003/2296* (2013.01); *C08K 2201/001* (2013.01)

(58) Field of Classification Search
CPC ........ C08G 77/16; C08G 77/18; C08G 77/70; C08G 77/80; C08K 2003/265; C08K 3/08; C08K 3/26; C08K 3/36; C08K 2201/001; C08K 2003/2296; C08K 3/22; C08K 9/02; C08K 5/54; C08L 83/04
See application file for complete search history.

(56) References Cited

U.S. PATENT DOCUMENTS

| | | | |
|---|---|---|---|
| 4,777,205 A | 10/1988 | La Scola et al. | |
| 5,164,443 A * | 11/1992 | Watanabe | C08K 3/04 524/495 |
| 5,217,651 A | 6/1993 | Nagaoka | |
| 5,356,954 A | 10/1994 | Adachi et al. | |
| 5,589,274 A | 12/1996 | Long et al. | |
| 5,770,269 A * | 6/1998 | Long | C09D 183/04 523/135 |
| 2006/0099338 A1 * | 5/2006 | Boelz | C09J 7/241 427/208.4 |
| 2015/0123044 A1 | 5/2015 | Yoshida | |

FOREIGN PATENT DOCUMENTS

| | | | |
|---|---|---|---|
| CN | 102234427 | 11/2011 | |
| CN | 102382616 | 3/2012 | |
| CN | 104790061 | 7/2015 | |
| JP | 1989065172 | 3/1989 | |
| JP | 1989287169 | 11/1989 | |
| JP | 1990170860 | 7/1990 | |
| JP | 03-149259 * | 6/1991 | |
| JP | 1991149259 | 6/1991 | |
| JP | H5239357 | 9/1993 | |
| JP | 2013245329 A | 12/2013 | |
| WO | WO-2007032481 A1 * | 3/2007 | ............ C08L 83/04 |
| WO | 2013180254 | 12/2013 | |
| WO | WO-2017162839 A1 * | 9/2017 | ............ B32B 17/06 |

OTHER PUBLICATIONS

Translation of JP 03-149259 (Year: 1991).*
Translation of WO 2007/032481 (Year: 2007).*
Patent Cooperation Treaty (PCT), International Search Report and Written Opinion for Application PCT/US2019/064098 filed on Dec. 3, 2019, mailed Feb. 6, 2020, International Searching Authority, EP.

* cited by examiner

*Primary Examiner* — Robert C Boyle
(74) *Attorney, Agent, or Firm* — Joseph Waters; McDonald Hopkins LLC

(57) ABSTRACT

A two-part RTV silicone is shown and described herein. In one aspect, provided is an electrostatically dissipative, two-part RTV silicone material. In embodiments, the silicone is white and exhibits a low thermal conductivity.

28 Claims, No Drawings

ELECTROSTATICALLY DISSIPATIVE ROOM TEMPERATURE VULCANIZABLE SILICONE

CROSS REFERENCE TO RELATED APPLICATION

The present application is a 35 U.S.C. § 371 national stage application of PCT Application No. PCT/US2019/064098 filed on Nov. 14, 2019, entitled "ELECTROSTATICALLY DISSIPATIVE ROOM TEMPERATURE VULCANIZABLE SILICONE," which claims priority to and the benefit of India Provisional Application No. 20/182,1045628 filed on Dec. 3, 2018, and India Provisional Application No. 20/192,1008912 filed on Mar. 7, 2019, each of which is incorporated herein by reference in its entirety

FIELD OF INVENTION

The present invention relates to a room temperature vulcanizable (RTV) silicone material. In particular, the present invention relates to a RTV silicone material that is electrostatically dissipative. The RTV silicone may also be white in color and have a low thermal conductivity.

BACKGROUND

Silicone compositions have long been known and are especially used as adhesives and sealing compositions in various applications. Widespread in this field, in addition to single-component silicone compositions that harden with moisture, also known as RTV-1 silicones (RTV-1: "room temperature vulcanizing, 1-part silicones"), are also two-component silicone compositions that undergo cross-linking at room temperature, also known as RTV-2 silicones (RTV-2: "room temperature vulcanizing, 2-part silicones").

While such compositions are widely used as adhesives or sealants in a variety of applications, their use may be limited based on various properties of the material. For example, in some applications the silicone material should be white in color, electrostatically dissipative and have a low thermal conductivity. Providing adhesives, and particularly silicone adhesives, with combinations of such properties as color, electrostatic charge dissipation and low thermal conductivity is a technical challenge. To provide these properties, it is often required to use multiple inputs to produce a composite having the desired properties. This can be both time consuming and expensive in terms of the materials required to produce such composites and/or in terms of actual production and processing of such materials in the end application.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

In one aspect, provided is an electrostatically dissipative, two-part RTV silicone material. In embodiments, the silicone is white and exhibits a low thermal conductivity.

In one aspect, provided is a two-part RTV silicone composition comprising: (A) a first part comprising (i) a silicone material containing a hydroxyl, alkoxy, or aryloxy group, (ii) an electrically conductive filler, and (iii) water, and optionally one or more of a solvent, a pigment, a filler, or a thixotropic agent; and (B) a second part comprising (i) a crosslinker material, (ii) a condensation curing catalyst, (iii) optionally a silicone material, and (iv) optionally a solvent, a pigment, and/or a filler.

In another aspect, provided is a two-part RTV silicone composition comprising:
a first part comprising:
a hydroxyl or alkoxy containing silicone;
a white electrically conductive filler;
water;
a white pigment; and
a filler; and
a second part comprising:
a silicone based crosslinker,
a white pigment;
a filler;
a condensation curing catalyst; and a silicone material chosen from a vinyl functional silicone, or a methyl terminated functional silicone.

In one embodiment, the compositions comprises a solvent. The solvent may be provided in the first part and/or the second part. In one embodiment, the solvent is chosen from a silicone fluid, a hydrocarbon based fluid, an alcohol based fluid, or a combination of two or more thereof.

In still another aspect, provided is a cured material formed from the RTV compositions.

In yet another aspect, provided is a method of forming a cured material from the RTV compositions comprising: combining the first part with the second part to form a mixture, and exposing the mixture to moisture.

In one embodiment, the silicone material exhibits a volume resistivity of from $10^5$ to about $10^{11}$ ohm·cm.

In one embodiment, the silicone material exhibits a thermal conductivity of about 1.0 W/m·K or less; about 0.7 W/m·K or less; or about 0.5 W/m·K.

In one embodiment, the silicone material is white in color having a L* value of about 80 or greater.

The following description and the drawings disclose various illustrative aspects. Some improvements and novel aspects may be expressly identified, while others may be apparent from the description and drawings.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a"

and "an" are generally intended to mean "one or more" unless context suggest otherwise.

Provided is a two-part, room temperature vulcanizable (RTV or RTV-2) silicone material that is electrically dissipative, optionally white in color, and optionally has a low thermal conductivity. In embodiments, the two-part RTV silicone is electrically dissipative, white in color, and has a low thermal conductivity. The two-part RTV silicone is suitable for use as an adhesive, sealant, or coating in a variety of applications. The two-part RTV silicone includes an electrically conductive filler.

The two-part RTV silicone includes a first part (Part A) and a second part (Part B) that when mixed together and exposed to air or moisture cures to form a material that may function as an adhesive, sealant, or coating.

First Part—Part A

The first part (Part A) of the two-part silicone comprises (i) a silicone material containing a hydroxyl, alkoxy, and/or aryloxy group, (ii) and an electrically conductive filler. Part A may optionally include other components including, for example, water, pigments, fillers, thixotropic agents, a solvent, etc.

The silicone material containing a hydroxyl, alkoxy, and/or aryloxy group, is generally a material with a silicone based backbone that contains at least one hydroxyl group and/or alkoxy group attached to a silicone atom. In embodiments, the silicone material containing a hydroxyl, alkoxy, and/or aryloxy group may be represented by a compound of the formula:

$$M^1_a M^2_b D^1_c D^2_d T^1_e T^2_f Q_g.$$

wherein:
$M^1 = R^1 R^2 R^3 SiO_{1/2}$
$M^2 = R^4 R^5 R^6 SiO_{1/2}$
$D^1 = R^7 R^8 SiO_{2/2}$
$D^2 = R^9 R^{10} SiO_{2/2}$
$T^1 = R^{11} SiO_{3/2}$
$T^2 = R^{12} SiO_{3/2}$
$R^{13} R^{14} R^{15}$
$R^{18} SiO_{3/2}$
$Q = SiO_{4/2}$ where $R^1$, $R^2$, $R^3$, $R^7$, $R^8$, and $R^{11}$ are independently chosen from a hydrogen, a $C_1$-$C_{30}$ aliphatic group; a $C_1$-$C_{30}$ alkenyl; a $C_1$-$C_{30}$; a $C_5$-$C_{30}$ cyclic containing aliphatic group; a $C_6$-$C_{30}$ aromatic containing group;

$R^4$, $R^5$, $R^6$, $R^9$, $R^{10}$, and $R^{12}$ are independently chosen from hydrogen; a $C_1$-$C_{30}$ aliphatic group; a $C_1$-$C_{30}$ alkenyl; a $C_1$-$C_{30}$; a $C_5$-$C_{30}$ cyclic containing aliphatic group; a $C_6$-$C_{30}$ aromatic containing group; —OH; —OR$^{13}$ where $R^{13}$ is a $C_1$-$C_{10}$ alkyl or $C_6$-$C_{30}$ aryl, with the provision that at least one of $R^4$, $R^5$, $R^6$, $R^9$, $R^{10}$, and/or $R^{12}$ is —OH or —OR$^{13}$;

the subscripts a, b, c, d, e, f, g, h, i, and j are zero or positive subject to the proviso that 2<a+b+c+d+e+f+g<20,000, and b+d+f>0.

The degree of polymerization, i.e., the value of a+b+c+d+e+f+g, may be selected as desired for a particular purpose or intended application. The degree of polymerization will affect the viscosity of the polymer. The viscosity of the silicone material containing a hydroxyl, alkoxy, and/or aryloxy group is in the range of 10 to 50,000,000 mPa s at 25° C. at a shear rate of D=1 s$^{-1}$. In one embodiment, the polymer has a viscosity of about 200 to 10,000,000 mPa·s.

In one embodiment, the a silicone material containing a hydroxyl, alkoxy, and/or aryloxy group is a polyorganosiloxane having a siloxane backbone repeating unit and a hydroxyl, alkoxy, and/or aryloxy terminal functional group.

In embodiments, the hydroxyl or alkoxy terminated silicone is of the formula $M^2 D^1_c M^2$ where $M^2$, $D^1$, $R^4$, $R^5$, $R^6$ and a are as described above and at least one of $R^4$, $R^3$, and/or $R^6$ are a hydroxyl group or a C1-C10 alkoxy group. In one embodiment, a is 0 to 10,000 and is such that the hydroxyl terminated silicone has a viscosity of 10 to 500,000 mPa·s at a temperature of 23° C. at 1 sec$^{-1}$ shear.

Examples of suitable hydroxyl, alkoxy, and/or aryloxy terminated polyinorganosiloxanes include, but are not limited to, hydroxyl, alkoxy, and/or aryloxy poly(dialkyl siloxane), e.g., hydroxyl, alkoxy, and/or aryloxy terminated poly(dimethyl siloxane); hydroxyl, alkoxy, and/or aryloxy terminated poly(alkylaryl siloxane), e.g., hydroxyl, alkoxy, and/or aryloxy terminated poly(methylphenyl siloxane) and poly(dimethyldiphenyl siloxane); and hydroxyl or alkoxy terminated poly(diaryl siloxane), e.g., hydroxyl, alkoxy, and/or aryloxy terminated poly(diphenyl siloxane). In some embodiments, the adhesive may comprise two or more hydroxyl, alkoxy, and/or aryloxy poly(diorganosiloxane) materials.

The silicone material containing a hydroxyl, alkoxy, and/or aryloxy group is present in the first part in an amount of from about 20% to about 90% by weight of the first part, from about 30% to about 80% by weight of the first part, from about 40% to about 70% by weight of the first part, or from about 50% to about 60% by weight of the first part. In one embodiment, the silicone material containing a hydroxyl, alkoxy, and/or aryloxy group is present in an amount of from about 45% to about 55% by weight of the first part. Here as elsewhere in the specification and claims, numerical values may be combined to form new and non-specified ranges.

The electrically conductive filler is chosen from a filler that is itself electrically conductive or a non-conductive filler that is coated with an electrically conductive material. In embodiments, the electrically conductive filler is a white filler material. An example of a filler that is itself electronically conductive is a white metal oxide powder that is doped with another element to render it electrically conductive. Examples of such materials include, but are not limited to aluminum-doped zinc oxide (abbreviated as AZO), antimony-doped tin oxide (abbreviated as ATO), and tin-doped indium oxide (abbreviated as ITO). The electrically conductive filler can have any shape as desired for a particular purpose or intended application. In one embodiment, the electrically conductive filler is spherical, acicular, filament, or hexagonal in shape.

The particle size of the electrically conductive filler can also be selected as desired. For white fillers that are doped to provide electrical conductivity the particles may be provided with a diameter such that the whiteness (L* value) is at least 70 according to the CIELab system. If the particles are too small, the particles become transparent and the whiteness tends to decrease. In embodiments, the electrically conductive filler has a particle size of from about 100 nm to about 500 μm; 500 nm to about 250 μm; or 1 μm to about 100 μm. Here as elsewhere in the specification and claims, numerical values may be combined to form new and non-specified ranges.

Examples of a surface-coated conductive filler include, but are not limited to, nonconductive white powders such as titanium oxide, zinc oxide, silica, aluminum oxide, magnesium oxide, zirconium oxide, a titanate of an alkali metal (such as potassium titanate), aluminum borate, barium sulfate, and synthetic fluoromica where the surface of the powder is coated with a transparent or white electrically conductive metal oxide such as ATO, AZO, or ITO. Titanium oxide is particularly suitable as the nonconductive white powder, but others can be used alone or in combination with titanium oxide. ATO and AZO are exemplary conductive metal oxides for surface coating because they have good covering properties.

The electrically conductive filler is present in an amount of from about 20% to about 50% by weight of the first part, from about 35% to about 45% by weight of the first part, or from about 35% to about 40% by weight of the first part. Here as elsewhere in the specification and claims, numerical value may be combined to form new and non-specific ranges.

The electrically conductive filler may have a pH of from 2.5 to 10, 4 to 8 or 5 to 7. In one embodiment, the electrically conductive filler is acidic and has a pH of from 2.5 to 4, 4 to 5.5, 5.5 to 7 etc. Here, as elsewhere in the specification and claims, numerical value may be combined to form new and non-specific ranges.

The water is present in an amount of from about 0.05% to about 0.3% by weight of the first part, or from about 0.15% to about 0.2% by weight of the first part. Here as elsewhere in the specification and claims, numerical value may be combined to form new and non-specific ranges.

The first part may also include other materials to impart desired properties to the silicone material upon curing. In embodiments, the first part includes pigments to impart desired color properties to the cured material. Examples of suitable pigments include, but are not limited to, red iron oxide, zinc oxide, carbon black, graphite, yellow iron oxide, white titanium oxide, chromium oxide, cobalt oxide, litharge, ultramarine, molybdenum red, and molybdenum yellow. In one embodiment, Part A includes white titanium oxide as a pigment.

The first part may also include other filler materials (i.e., fillers different from the electrically conductive filler) to impart other desired properties to the cured material. The term filler is used generally as understood by the art and is intended to encompass but not limited to, metal oxides, metal borides, metal carbides, metal nitrides, metal silicides, carbon black, graphite, expanded graphite, carbon fiber, or graphite fiber or a combination of two or more thereof. Some specific examples of suitable fillers include, but are not limited to, alumina, magnesia, ceria, hafnia, lanthanum oxide, neodymium oxide, samaria, praseodymium oxide, thoria, urania, yttria, zinc oxide, zirconia, silicon aluminum oxynitride, borosilicate glasses, barium titanate, silicon carbide, silica, formed silica, boron carbide, titanium carbide, zirconium carbide, boron nitride, silicon nitride, aluminum nitride, titanium nitride, zirconium nitride, zirconium boride, titanium diboride, aluminum dodecaboride, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, titanium dioxide, glass fibers, glass flake, clays, exfoliated clays, or other high aspect ratio fibers, rods, or flakes, calcium carbonate, zinc oxide, magnesia, titania, calcium carbonate, talc, mica, wollastonite, alumina, aluminum nitride, graphite, expanded graphite, metallic powders, e.g., aluminum, copper, bronze, brass, etc., fibers or whiskers of carbon, graphite, silicon carbide, silicon nitride, alumina, aluminum nitride, zinc oxide, nano-scale fibers such as carbon nanotubes, boron nitride nanosheets, zinc oxide nanotubes, etc., and mixtures of two or more thereof. In one embodiment, Part A includes calcium carbonate and/or formed silica.

The additional or other filler may be present in the first part in an amount of from about 0.05% to about 30%; from about 1% to about 20%, or from about 5% to about 15%. Here as elsewhere in the specification and claims, numerical values may be combined to form new and non-specified ranges.

Although the upper ends and/or lower ends of the ranges recited for the various embodiments for the components of Part A may not add up to 100%, it will be appreciated that the sum of the respective components in the first part (Part A) will be 100%.

Second Part—Part B

The second part (Part B) of the two-part silicone composition includes (i) a crosslinker, (ii) a condensation curing catalyst, (iii) optionally a functionalized silicone, (ii) and optionally (iv) pigments, fillers, a solvent, or other materials as desired to provide particular properties to the cured material.

Part B comprises a silicone based crosslinker. Examples of suitable crosslinkers include, but are not limited to, an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, an imidatosilane, a ureidosilane, an isocyanatosilane, a thioisocyanatosilane, and combinations of two or more thereof. Examples of suitable cross-linkers include, but are not limited to, methoxy silane, ethoxy silane, propoxy silane, tetraethylorthosilicate (TEOS); methyltrimethoxysilane (MTMS); methyltriethoxysilane; vinyltrimethoxysilane; vinyltriethoxysilane; methylphenyldimethoxysilane; 3,3,3-trifluoropropyltrimethoxysilane; methyltriacetoxysilane; vinyltriacetoxysilane; ethyltriacetoxysilane; di-butoxydiacetoxysilane; phenyltripropionoxysilane; methyltris(methylethylketoxime)silane; vinyltris(methylethylketoxime)silane; 3,3,3-trifluoropropyltris(methylethylketoxime)silane; methyltris(isoprenoxy)silane; vinyltris(isoprenoxy)silane; ethylpolysilicate; dimethyltetraacetoxydisiloxane; tetra-n-propylorthosilicate; methyldimethoxy(ethylmethylketoximo)silane; methylmethoxybis-(ethylmethylketoximo)silane; methyldimethoxy(acetaldoximo)silane; methyldimethoxy(N-methylcarbamato)silane; ethyldimethoxy(N-methylcarbamato)silane; methyldimethoxyisopropenoxysilane; trimethoxyisoprenoxysilane; methyltri-iso-propenoxysilane; methyldimethoxy(but-2-ene-2-oxy)silane; methyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxyethylaminosilane; dimethyldi-N,N-dimethylaminosilane; methyldimethoxyisopropylaminosilane dimethyldi-N,N-diethylaminosilane. ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyldimethoxyethylacetimidatosilane; methyldimethoxypropylacetimidatosilane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxythioisocyanatosilane; methylmethoxydithioisocyanatosilane, etc., and combinations of two or more thereof.

Any suitable condensation curing catalyst may be employed in the composition. In one embodiment, the catalyst may be an organotin based catalyst Examples of suitable organotin compounds include, but are not limited to, organotin carboxylates having from 2 to 20 carbon atom(s) and organotin halides. Specific examples of such organotin compounds include, but are not limited to, diorganotin dicarboxylates, in particular dibutyltin dilaurate and also including dibutyltindiacetate, dibutyltinbisneodecanoate, stannous octaote, stannous oxide, dibutyl tin dichloride and dibutyltinbis acetylacetonoate. However, other tin catalysts can also be utilized, such as a member selected from the class consisting of diacylstannoxane, acylhydroxystannoxane, monomethoxyacylstannanes, dihalostannoxane, dimethylhydroxyoleate tin (DMHOT), or halohydroxystannoxane. The catalyst can employ other catalysts (either separately or used in conjunction with a tin catalyst) such as complexes or salts of metals including but not limited to titanium, zirconium, zinc, aluminum, iron, and bismuth; carboxylic acids including but not limited to acetic acid, lauric acid, stearic acid, and versatic acid; alkyl- and arylsulfonic acids including but not limited to p-toluenesulfonic acid and methanesulfonic acid; inorganic acids including but not limited to hydrochloric acid, phosphoric acid, and boric acid; amines including but not limited to trioctylamine; guanidines including but not limited to tetramethylguanidine; amidines including but not limited to 1,8-diazabicyclo[5.4.0]-7-undecene (DBU) and 1,5-diazabicyclo[4.3.0]non-5-ene (DBN); and inorganic bases including but not limited to lithium hydroxide and sodium methoxide Part B optionally includes a silicone material (iii). The silicone material may or may not be reactive with the hydroxyl or alkoxy functional silicone material of Part A. In one embodiment, the silicone material (iii) is of the formula:

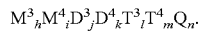

wherein:
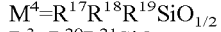
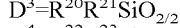
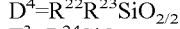
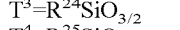
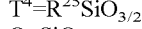
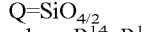

where $R^{14}$, $R^{15}$, $R^{16}$, $R^{20}$, $R^{21}$, and $R^{24}$ are independently chosen from a hydrogen, a $C_1$-$C_{30}$ aliphatic group; a $C_1$-$C_{30}$ alkenyl; a $C_1$-$C_{30}$; a $C_5$-$C_{30}$ cyclic containing aliphatic group; a $C_6$-$C_{30}$ aromatic containing group;

$R^{17}$, $R^{18}$, $R^{19}$, $R^{22}$, $R^{23}$, and $R^{25}$ are independently chosen from a C1-C10 alkyl, hydrogen, a $C_1$-$C_{30}$ aliphatic group; a $C_1$-$C_{30}$ alkenyl; a $C_1$-$C_{30}$; a $C_5$-$C_{30}$ cyclic containing aliphatic group; a $C_6$-$C_{30}$ aromatic containing group; a $C_2$-$C_{30}$ unsaturated hydrocarbon;

the subscripts h, i, j, k, l, m, and n subscripts are zero or positive subject to the proviso that $2 < h+i+j+k+l+m+n < 20,000$.

The degree of polymerization, i.e., the value of a h+i+j+k+l+m+n may be selected as desired for a particular purpose or intended application. The degree of polymerization will affect the viscosity of the polymer. The viscosity of the hydroxyl and/or alkoxy containing polymers are in the range of 10 to 50,000,000 mPa·s at 25° C. at a shear rate of D=1 s$^{-1}$. In one embodiment, the polymer has a viscosity of about 200 to 10,000,000 mPa·s.

In one embodiment, the silicone material (iii) includes an unsaturated group such as an alkenyl group. Referring to the formula described above with respect to silicone material (iii), an alkenyl containing group would be such that at least one of $R^{17}$, $R^{18}$, $R^{19}$, $R^{22}$, $R^{23}$, and/or $R^{25}$ would comprise an alkenyl group (and i+k+m is greater than 0). Examples of suitable alkenyl groups may include, but is not limited to, vinyl, allyl, methallyl, 3-butenyl, 5-hexenyl, 7-octenyl, cyclohexenylethyl, limonenyl, norbornenylethyl, ethylidennorbomyl and styryl. In embodiments, the alkenyl group is attached to a terminal silicon atom. Examples of suitable vinyl terminated polyorganosiloxanes include, but are not limited to, poly(dialkyl siloxane), e.g., vinyl terminated poly(dimethyl siloxane); hydroxyl terminated poly(alkylaryl siloxane), e.g., vinyl terminated poly(methylphenyl siloxane) and poly(dimethyldiphenyl siloxane); and vinyl terminated poly(diaryl siloxane), e.g., poly(diphenyl siloxane). In some embodiments, the adhesive may comprise two or more poly(diorganosiloxane) materials.

The crosslinker may be present in an amount of from about 5% to 50% by weight of the second part, from about 10% to about 40% by weight of the second part, or from about 20% to about 30% by weight of the second part. The catalyst is present in an amount of from about 1% to 10% by weight of the second part, from about 2.5% to about 8.5% by weight of the second part, or from about 4% to about 7% by weight of the second part. The silicone material (iii) may be present in an amount of from about 0% to 60% by weight of the second part, from about 10% to about 50% by weight of the second part, or from about 20% to about 40% by weight of the second part. Here as elsewhere in the specification and claims, numerical values may be combined to form new and non-specified ranges. Here as elsewhere in the specification and claims, numerical values may be combined to form new and non-specified ranges.

Part B may also comprise one or more pigments to provide a desired color. Examples of suitable pigments include, but are not limited to, red iron oxide, zinc oxide, carbon black, graphite, yellow iron oxide, white titanium oxide, chromium oxide, cobalt oxide, litharge, ultramarine, molybdenum red, and molybdenum yellow. In one embodiment, Part B includes white titanium oxide as a pigment.

The second part may also include other filler materials to impart other desired properties to the cured material. Examples of suitable fillers include, but are not limited to, a metal oxide, a metal boride, a metal carbide, a metal nitride, a metal silicide, carbon black, graphite, graphene, graphene oxide, expanded graphite, carbon fiber, or graphite fiber or a combination of two or more thereof. Examples of suitable fillers include, but are not limited to, alumina, magnesia, ceria, hafnia, lanthanum oxide, neodymium oxide, samaria, praseodymium oxide, thoria, urania, yttria, zinc oxide, zirconia, silicon aluminum oxynitride, borosilicate glasses, barium titanate, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, titanium dioxide, glass fibers, glass flake, clays, exfoliated clays, or other high aspect ratio fibers, rods, or flakes, calcium carbonate, zinc oxide, magnesia, titania, calcium carbonate, talc, mica, alumina, aluminum nitride, graphite, expanded graphite, metallic powders, e.g., aluminum, copper, bronze, brass, etc., fibers or whiskers of carbon, graphite, silicon carbide, silicon nitride, alumina, aluminum nitride, zinc oxide, nano-scale fibers such as carbon nanotubes, boron nitride nanosheets, zinc oxide nanotubes, etc., and mixtures of two or more thereof.

The additional or other filler may be present in the first part in an amount of from about 0.05% to about 30%; from about 1% to about 20%, or from about 5% to about 15%. Here as elsewhere in the specification and claims, numerical values may be combined to form new and non-specified ranges.

Illustrative of useful thixotropic agents are various castor waxes, fumed silica, treated clays and polyamides. These optional additives typically comprise from 0 to 10, and preferably from 0.1 to 2, weight parts per 100 weight parts of the total two-part composition herein. The thixotropes include those available as: Aerosil from Degussa, Cabo-Sil TS 720 from Cabot, Castorwax from CasChem, Thixatrol and Thixcin from Rheox, Crayvallac from Crayvalley Corp., and Dislon from King Industries. If the thixotrope is reactive with silane (e.g., silica), adjustments to the amount formulated may be needed to compensate therefor.

Although, when taken together the upper ends and/or lower ends of the ranges recited in the various embodiments for the components of Part B may not add up to 100%, it will be appreciated that the sum of the respective components in a composition forming the second part will be 100%.

In embodiments, the composition includes a solvent, which may be provided to control or adjust the flowability of the composition. As used herein, the solvent may also be referred to as a plasticizer. In one embodiment, the solvent is chosen from a silicone oil (which may also be referred to herein as a silicone fluid), a hydrocarbon based fluid, an alcohol based fluid, or a mixture of two or more thereof. Practioners skilled in the art will appreciate that the solvent may also include a mixture of different materials within a given class or category of solvent materials. For example, the solvent may include a mixture of two or more silicone fluids, or a mixture of two or more alcohol-based fluids, or a mixture of two or more different hydrocarbon based fluids. Additionally, the compositions could include a mixture of different types of solvents and include a plurality of different solvents within a given type of solve (e.g., a mixture of a plurality of silicone fluids with a hydrocarbon fluid and/or with a plurality of hydrocarbon fluids).

Examples of suitable silicone oils include linear or cyclic silicone oils having from 2 to 2000 silicon atoms, 5 to 1000 silicon atoms, 10 to 500 silicon atoms, 25 to 250 silicon atoms, or 50 to 100 silicon atoms, where the silicon atoms may be optionally substituted with alkyl or alkoxy groups of 1 to 10 carbon atoms. Linear silicone oils may be of the formula $(R^{26})_3—Si—[O—Si(R^{27})_2—O]_p—Si(R^{28})_3$, where $R^{26}$, $R^{27}$, and $R^{28}$ are independently chosen from a C1-C20 saturated or unsaturated hydrocarbon group, which may be saturated or unsaturated, linear, branched, or cyclic, and is optionally substituted with a halo group, and p is 2 or greater, preferably from 2 to about 20. In embodiments, $R^{26}$, $R^{27}$, and $R^{28}$ are independently chosen from methyl, ethyl, propyl, phenyl, trifluoropropyl, vinyl, etc. Specific oils that may be used in the invention include octamethyltetrasiloxane (D4), decamethylcyclopentasiloxane (D5), dodecamethylcyclohexasiloxane (D6), heptamethyloctyltrisiloxane, hexamethyldisiloxane, decamethyltetrasiloxane, dodecamethylpentasiloxane, etc.

The alcohol based fluids may be chosen from mono- or polyhydric hydrocarbon-based alcohols. Examples of suitable alcohol based fluids include, but are not limited to a C1-C10 alcohol such as methanol, ethanol, propanol, isopropanol, butanol, pentanol, hexanol, heptanol, octanol, decanol, etc. Also included are fatty alcohols and mixtures thereof, including, but not limited to, saturated C12-C30 alcohols such as lauryl, myristyl, cetyl, stearyl and behenyl alcohols, and unsaturated C12-C30 alcohols such as palmitoleyl, oleyl and eicosenyl. Higher synthetic monohydric alcohols of the type formed by the Oxo process (e.g., 2-ethylhexanol), by the aldol condensation, or by organo-aluminum-catalyzed oligomerization of alpha-olefins (e.g., ethylene), followed by oxidation, may be used. Alicyclic analogs of the above-described alcohols may be used; examples include cyclopentanol, cyclohexanol, cyclododecanol, etc. Examples of polyhydroxy compounds include, but are not limited to, ethylene, propylene, butylene glycols; di-, tri-, tetra-, penta-, hexa- and hepta-ethylene glycols and hydrocarbon-substituted analogs thereof (e.g., 2-ethyl-1,3-trimethylene glycol, neopentyl glycol, etc.), as well as polyoxyalkylene compounds such as diethylene and higher polyethylene glycols, tripropylene glycol, dibutylene glycol, dipentylene glycol, dihexylene glycol and diheptylene glycol, and their monoethers.

The hydrocarbon based fluids include, for example aliphatic and aromatic hydrocarbons. Examples of suitable aliphatic and aromatic hydrocarbons include, but are not limited to, naphtha, mineral spirits, alkenes of about 5 to about 20 carbon atoms (e.g., pentene, hexenes, octenes, and the like), toluene, xylenes, mono-, di-, tri-, and tetra-alkyl benzenes, naphthalene and alkyl substituted naphthalenes, indane, and mixtures of two or more thereof.

The solvent can be provided in the composition in an amount of from about 0.5% to about 75% by weight of the composition; from about 1% to about 50% by weight of the composition; from about 2.5% to about 25% by weight of the composition, or from about 5% to about 10% by weight of the composition. In one embodiment, the solvent is provided in an amount of from about 5% to about 20% by weight. In one embodiment, the solvent is provided in an amount of from about 10% to about 15% by weight. Here as elsewhere in the specification and claims, numerical values may be combined to form additional or non-specified ranges.

The solvent can be provided in either component A or component B. In one embodiment, the solvent is provided as part of component A.

Both component A and component B of the previously-described two-component silicone composition are especially manufactured and stored under exclusion of moisture. The two components are storage-stable separately from one another, in other words, they can be stored for a period of up to several months or more in a suitable package or arrangement without their application properties or their properties after curing changing to an extent that would be relevant for their use. The storage stability is usually determined by measuring the viscosity or reactivity over time. Applicant has found that the system incorporating the electrically conductive filler in Part A exhibits a stable shelf life. In particular, the system can have a shelf life of greater than two months, greater than four months, greater than six months or greater than a year. In embodiments, the system can have a shelf life of from about 1 month to about 2 years, from about 2 months to about 18 months, or from about 6 months to about 12 months.

In the application of the two-component silicone composition, Parts A and B are mixed together, for example by agitation, kneading, rolling, or the like. In this process the hydroxyl groups or the hydrolyzable groups of the polyorganosiloxane come into contact with the hydrolyzable groups of the functionalized polysiloxane or optionally with already hydrolyzed groups of the cross-linking agent, wherein curing of the composition takes place by condensation reactions. Contact of the silicone composition of Parts A and B with water, especially in the form of humidity, during applications likewise promotes cross-linking, since reaction of the water with hydrolyzable groups results in formation of more highly reactive silanol groups. The curing of the two-component silicone composition, in particular, is done at room temperature (e.g., from about 20° C. to 30° C., including about 25° C.).

The formulated material, i.e., the mixture of the respective components prior to curing, may have a viscosity of from about 1,000 to about 10,000,000 cPs at 23° C.; about 2,500 to about 5,000,000 cPs at 23° C.; about 5,000 to about 2,500,000 cPs at 23° C.; about 10,000 to about 1,000,000 cPs at 23° C.; about 25,000 to about 750,000 cPs at 23° C.; about 50,000 to about 500,000 cPs at 23° C.; or about 75,000 to about 250,000 cPs at 23° C. In on embodiment, the formulated material has a viscosity ranging from about 1,000 to about 500,000 cPs at a shear rate of 1 sec$^{-1}$; from about 2,500 to about 250,000 cPs at a shear rate of 1 sec$^{-1}$; from about 5,000 to about 100,000 cPs at a shear rate of 1 sec$^{-1}$; from about 10,000 to about 75,000 cPs at a shear rate of 1 sec$^{-1}$; or from about 25,000 to about 50,000 cPs at a shear rate of 1 sec$^{-1}$. Here as elsewhere in the specification and claims, numerical values may be combined to form alternative and non-specified ranges.

As the term is used herein, viscosity is measured with a TA Instruments DHR using parallel plate geometry (20 mm diameter, 1 mm gap) at 25° C. and a shear rate of 1 s$^{-1}$.

In the cross-linking of the two-component silicone composition, byproducts of the condensation reaction that form are especially compounds which do not damage either the composition or the substrate to which the composition is applied. Most preferably the byproducts are compounds which evaporate readily from the cross-linking or already cross-linked composition.

In particular the two-component silicone composition according to the invention is used in such a way that the weight ratio of Part A to Part B is ≥1:1, especially 3:1 to 15:1, preferably 10:1 to 13:1. In embodiments in which Part B employs a crosslinker and catalyst without any additional alkenyl functional silicone, filler, pigments, and additives, the ratio of Part A to Part B is about 100:2.5.

The composition exhibits excellent deep section curing. Deep section curing can be on the order of about 0.25 inches.

The cured material may have a volume resistivity of from $10^5$ to about $10^{11}$ ohm·cm. Volume resistivity may be measured using methods based on ASTM D257 and/or ASTM D991.

In one embodiment, the silicone material has a low thermal conductivity. For example, in embodiments, the silicone material exhibits a thermal conductivity of about 1.0 W/m·K or less; about 0.7 W/m·K or less; or about 0.5 W/m·K. Experts skilled in the art will recognize that the thermal conductivity of the composition could be tuned by employing different types of fillers, e.g., fillers that exhibit higher thermal conductivity such as boron nitride. Thermal conductivity can be evaluated using a Hot Disk or Laser Flash apparatus.

In one embodiment, the silicone material is white in color having a L* value of about 80 or greater, 85 or greater, 90 or greater, or 95 or greater. In one embodiment, the silicone material has an L* value of about 80 to about 100; about 85 to 95; or about 87 to about 92. As used herein, the L* value of a color is a measure for the lightness of a color according to the Commission Internationale de l'Eclairage L*a*b* color space (CIE 1976; hereinafter "CIELab"). The L*a*b* colorimetric system was standardized in 1976 by Commission Internationale de l'Eclairage (CIE). The CIELab L* value, utilized herein to define the darkness/lightness of the polymer composition according to the present invention, is a unit of color measurement in the afore-mentioned CIELab system. The L* values may be measured using a colorimeter such as, for example, a spectrophotometer.

The two-part silicone composition finds particular use for providing a material that can function as an adhesive, sealant, and/or coating in a variety of applications including, but not limited to, automotive, electronic, construction, aerospace, aviation, medical, personal care, etc.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Examples

Tables 1 and 2 below provide examples of various Part A compositions (Table 1) and Part B compositions (Table 2) for forming a cured silicone material. Cured samples were prepared by mixing a Part A component with a Part B component as shown in Table 3 and exposing the mixture to ambient air (about 25° C.). The formulations in Table 3 are prepared using a ratio of Part A:Part B of 10:1 by volume.

TABLE 1

| Input | Ex. 1 | Ex. 2 | Ex. 3 | Ex. 4 | Ex. 5 | Ex. 6 | Ex. 7 | Ex. 8 |
|---|---|---|---|---|---|---|---|---|
| Conductive TiO2 (SnO2 and Sb2O5 doped)* | 35.57 | 40.59 | 45.60 | 40.59 | 40.59 | 40.59 | 34.5 | 34.5 |
| Silanol Terminated - Diphenyldimethylsiloxane | 54.13 | 49.14 | 44.15 | 49.14 | 49.14 | 49.14 | 41.76 | 41.76 |
| Water | 0.14 | 0.14 | 0.14 | 0.14 | 0.14 | 0.14 | 0.1 | 0.1 |
| TiO2 Pigment | 10.16 | 10.13 | 10.11 | 8.13 | 7.13 | 0.00 | 8.59 | 8.59 |

TABLE 1-continued

| Input | Ex. 1 | Ex. 2 | Ex. 3 | Ex. 4 | Ex. 5 | Ex. 6 | Ex. 7 | Ex. 8 |
|---|---|---|---|---|---|---|---|---|
| CaCO3 | 0.00 | 0.00 | 0.00 | 0.00 | 0.00 | 7.13 | 0 | 0 |
| Fumed Silica | 0 | 0 | 0 | 2 | 0 | 0 | 0 | 0 |
| Hydrogenated Castor Oil/Amide Wax (Thixotrope) | 0 | 0 | 0 | 0 | 3 | 3 | 0 | 0 |
| Isopropanol (solvent) | 0 | 0 | 0 | 0 | 0 | 0 | 15 | 0 |
| Mineral Spirits | 0 | 0 | 0 | 0 | 0 | 0 | 0 | 15 |
| TOTAL | 100 | 100 | 100 | 100 | 100 | 100 | 100 | 100 |
| Viscosity at 1 sec$^{-1}$ (cP) | | 419000 | | 7630000 | 6728000 | | 81800 | 57500 |

TABLE 2

| Input | Ex. 1B* | Ex. 2B | Ex. 3B | Ex. 4B | Ex. 5B |
|---|---|---|---|---|---|
| Vinyl Terminated-Diphenyldimethylsiloxane | 0.00 | 38.00 | 26.05 | 25.55 | 26.04 |
| Fumed Silica | 0.00 | 25.00 | 20.95 | 20.95 | 29 |
| CaCO3 | 0.00 | 0.00 | 18.66 | 18.66 | 10.61 |
| TiO2 Pigment | 0.00 | 5.00 | 4.75 | 4.75 | 4.47 |
| Ultramarine Blue Pigment | 0.00 | 0.00 | 0.00 | 0.50 | 0.29 |
| Alkoxysilane Crosslinker | 78.13 | 25 | 23.34 | 23.34 | 23.34 |
| Tin Catalyst | 21.87 | 7 | 6.25 | 6.25 | 6.25 |
| TOTAL | 100 | 100 | 100 | 100 | 100 |
| Viscosity at 1 sec$^{-1}$ (cP) | | 661000 | | 718000 | |

TABLE 3

| Mixed Example # | A Component | B Component | L* (white) | Resistivity^ (ohms) | Volume Resistivity (ohm·cm) | Thermal Conductivity (W/mK) | Work life (mins) | Tack Free Time (mins) | Thick Section Cure (mins)* |
|---|---|---|---|---|---|---|---|---|---|
| 1 | 1 | 1B | 90.6 | 4.00E+07 | 9.67E+08 | 0.4 | 20 | | |
| 2 | 2 | 1B | 90.5 | 3.20E+05 | 1.71E+09 | 0.45 | 20 | 17 | 20 |
| 3 | 3 | 1B | 90 | 1.00E+05 | 5.75E+08 | 0.49 | 20 | | |
| 4 | 2 | 2B | 90.7 | 5.75E+04 | 1.60E+08 | | 25 | 32 | 33 |
| 5 | 2 | 3B | 90.9 | 5.05E+05 | 9.04E+08 | | 20 | 26 | 26 |
| 6 | 7 | 5B | 91.2 | 4.00E+04 | 6.18E+10 | | | 34 | |
| 7 | 8 | 5B | 90.2 | 4.00E+03 | 3.63E+09 | | | 25 | |

Cured materials were also prepared after ageing the Part A and Part B components for a varied period of time. The results of this test are shown in Table 4.

TABLE 4

| Mixed Example # | A Component | B Component | Days Aged (d) | Worklife (mins) | Resistivity^ (ohms) |
|---|---|---|---|---|---|
| 1 | 1 | 1B | 0 | 20 | 5.25E+04 |
| | | | 7 | 20 | 6.00E+05 |
| | | | 16 | 25 | 2.50E+04 |
| 2 | 2 | 1B | 0 | — | 2.00E+04 |
| | | | 7 | — | 3.00E+05 |
| | | | 16 | 20 | 4.50E+04 |
| 3 | 3 | 1B | 0 | — | 1.75E+04 |
| | | | 7 | — | 8.00E+04 |
| | | | 16 | 20 | 2.50E+04 |
| 4 | 3 | 2B | 0 | 23 | — |
| | | | 5 | 25 | 5.75E+04 |
| | | | 10 | 19 | — |
| 5 | 3 | 3B | 0 | 17 | — |
| | | | 5 | 20 | 5.05E+05 |
| | | | 10 | 18 | — |
| 6 | 7 | 5B | 1 | — | 1.50E+04 |
| | | | 7 | — | 4.00E+04 |

Table 5 provides data for comparative compositions and cured properties for different Part A compositions.

TABLE 5

| Input | 1E | 2E | 3E | 4E | 5E | 6E | 7E |
|---|---|---|---|---|---|---|---|
| Carbon nanotube dispersion | 20.00 | 11.76 | 0.00 | 0.00 | 0.00 | 0.00 | 0.00 |
| Titanium dioxide/Tin oxide | 0.00 | 0.00 | 60.00 | 0.00 | 0.00 | 0.00 | 0.00 |
| Titanium dioxide/Tin oxide/Antimony oxide | 0.00 | 0.00 | 0.00 | 50.00 | 0.00 | 0.00 | 0.00 |

TABLE 5-continued

| Input | 1E | 2E | 3E | 4E | 5E | 6E | 7E |
|---|---|---|---|---|---|---|---|
| Zinc Oxide doped with Aluminum | 0.00 | 0.00 | 0.00 | 0.00 | 60.00 | 0.00 | 0.00 |
| Zinc Oxide/Aluminum Oxide | 0.00 | 0.00 | 0.00 | 0.00 | 0.00 | 50.00 | 0.00 |
| Conductive TiO2 doped with SnO2 and Sb2O5 (CANDIDATE MATERIAL) | 0.00 | 0.00 | 0.00 | 0.00 | 0.00 | 0.00 | 40.59 |
| Silanol Terminated - Diphenyldimethylsiloxane | 46.13 | 27.14 | 23.06 | 28.83 | 38.70 | 38.70 | 49.14 |
| $CaCO_3$ | 20.76 | 12.21 | 10.38 | 12.97 | 0.00 | 0.00 | 0.00 |
| Zinc Oxide | 9.23 | 5.43 | 4.61 | 5.77 | 0.00 | 0.00 | 0.00 |
| $TiO_2$ Pigment | 0.00 | 41.18 | 0.00 | 0.00 | 0.00 | 10.00 | 7.13 |
| Fumed Silica | 0.00 | 0.00 | 0.00 | 0.00 | 0.00 | 0.00 | 0.00 |
| Alkoxysilane Crosslinker | 1.46 | 0.86 | 0.73 | 0.91 | 1.20 | 1.20 | 0.00 |
| Water | 0.12 | 0.07 | 0.06 | 0.07 | 0.10 | 0.10 | 0.14 |
| Hydrogenated Castor Oil/Amide Wax (Thixotrope) | 2.31 | 1.36 | 1.15 | 1.44 | 0.00 | 0.00 | 3.00 |
| TOTAL | 100.00 | 100.00 | 100.00 | 100.00 | 100.00 | 100.00 | 100.00 |
| Catalyst | RTV9811 | RTV9811 | DMHOT | DMHOT | DMHOT | DMHOT | RTV582B |
| Color | Dark Gray | Gray | White | Gray | Green | Near White | Near White |
| Volume Resistivity (ohm · cm) | 8.00E+10 | 1.07E+14 | 1.00E+14 | 3.64E+12 | 8.21E+12 | 1.41E+09 | 3.44E+09 |
| L* (white) | — | — | — | — | — | 90.9 | 0.42 |
| Solar Absorptance ($\alpha$) | — | — | — | — | — | 0.453 | 0.397 |

RTV9811: Available from Momentive Performance Materials, Inc.
DMHOT: dimethylhydroxyoleate tin
RTV582B: Available from Momentive Performance Materials, Inc.

7E in Table 5 corresponds to Example 5 in Table 1 and is representative of a composition in accordance with aspects of the present technology.

The foregoing description identifies various, non-limiting embodiments of a condensation curable silicone composition. Modifications may occur to those skilled in the art and to those who may make and use the invention. The disclosed embodiments are merely for illustrative purposes and not intended to limit the scope of the invention or the subject matter set forth in the claims.

What is claimed is:

1. A two-part, room temperature vulcanizable composition comprising:
   (A) a first part comprising:
      (i) a silicone material containing a hydroxyl, alkoxy, or aryloxy group, and
      (ii) an electrically conductive filler; and
   (B) a second part comprising:
      (i) a cross linker, and
      (ii) a condensation curing catalyst;
   wherein a material formed from a reaction of the first part (A) and the second part (B) has a volume resistivity of from $10^5$ to about $10^{11}$ ohm·cm, a thermal conductivity of about 1.0 W/m·K or less; about 0.7 W/m·K or less; or about 0.5 W/m·K, and is white in color having a L* value of about 80 or greater.

2. The composition of claim 1, wherein the electrically conductive filler is a white electrically conductive filler having a whiteness value of at least 70.

3. The composition of claim 1, wherein the electrically conductive filler is selected from a doped metal oxide, a non-conductive filler coated with an electrically conductive material, or a combination of two or more thereof.

4. The composition of claim 3 wherein the doped metal oxide is selected from aluminum-doped zinc oxide, antimony-doped tin oxide, tin-doped indium oxide, or a combination of two or more thereof.

5. The composition of claim 3, wherein the non-conductive filler coated with an electrically conductive material comprises (a) a non-conductive filler material selected from titanium dioxide, zinc oxide, silica, aluminum oxide, magnesium oxide, zirconium oxide, a titanate of an alkali metal, aluminum borate, barium sulfate, or fluromica, and (b) an electrically conductive material coating selected from aluminum-doped zinc oxide, antimony-doped tin oxide, tin-doped indium oxide, or a combination of two or more thereof.

6. The composition of claim 5, wherein the electrically conductive filler is titanium dioxide coated with antimony-doped tin oxide or aluminum-doped zinc oxide.

7. The composition of claim 1, wherein the electrically conductive filler is present in an amount of from about 20% by weight to about 50% by weight based on the weight of the first part (A).

8. The composition of claim 1, wherein the electrically conductive filler is present in an amount of from about 35% by weight to about 45% by weight based on the weight of the first part (A).

9. The composition of claim 1, wherein the first part (A), the second part (B), or both the first part (A) and the second part (B) comprises a solvent.

10. The composition of claim 9, wherein the solvent is selected from a silicone oil, a hydrocarbon based fluid, an alcohol based fluid, or a combination of two or more thereof.

11. The composition of claim 10, wherein the solvent is a silicone oil selected from a linear or cyclic silicon oil having from 2 to 200 silicon atoms.

12. The composition of claim 11, wherein the silicone oil is a linear silicone oil of the formula $(R^{26})_3$—Si—[O—Si$(R^{27})_2$—O]$_p$—Si$(R^{28})_3$, where $R^{26}$, $R^{27}$, and $R^{28}$ are independently chosen from a C1-C20 saturated or unsaturated hydrocarbon group that is linear, branched, or cyclic, and is optionally substituted with a halo group, and p 2 to 20.

13. The composition of claim 11, wherein the silicone oil is selected from octamethyltetrasiloxane (D4), decamethylcyclopentasiloxane (D5), dodecamethylcyclohexasiloxane (D6), heptamethyloctyltrisiloxane, hexamethyldisiloxane, decamethyltetrasiloxane, dodecamethylpentasiloxane.

14. The composition of claim 10, wherein the solvent is an alcohol based fluid selected from a C1-C12 alcohol.

15. The composition of claim 10, wherein the solvent is present in an amount of from about 0.5% by weight to about 75% by weight based on the weight of the composition.

16. The composition of claim 10, wherein the solvent is present in an amount of from about 5% by weight to about 20% by weight based on the weight of the composition.

17. The composition of claim 10, wherein the solvent is provided in the first part (A).

18. The composition of claim 1, wherein the silicon material containing a hydroxyl, alkoxy, and/or aryloxy group is represented by a compound of the formula:

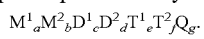
$M^1_a M^2_b D^1_c D^2_d T^1_e T^2_f Q_g.$ wherein:
$M^1 = R^1 R^2 R^3 SiO_{1/2}$
$M^2 = R^4 R^5 R^6 SiO_{1/2}$
$D^1 = R^7 R^8 SiO_{2/2}$
$D^2 = R^9 R^{10} SiO_{2/2}$
$T^1 = R^{11} SiO_{3/2}$
$T^2 = R^{12} SiO_{3/2}$
$Q = SiO_{4/2}$ where $R^1$, $R^2$, $R^3$, $R^7$, $R^8$, and $R^{11}$ are independently chosen from a hydrogen, a $C_1$-$C_{30}$ aliphatic group; a $C_1$-$C_{30}$ alkenyl; a $C_1$-$C_{30}$; a $C_5$-$C_{30}$ cyclic containing aliphatic group; a $C_6$-$C_{30}$ aromatic containing group; $R^4$, $R^5$, $R^6$, $R^9$, $R^{10}$, and $R^{12}$ are independently chosen from hydrogen; a $C_1$-$C_{30}$ aliphatic group; a $C_1$-$C_{30}$ alkenyl; a $C_1$-$C_{30}$; a $C_5$-$C_{30}$ cyclic containing aliphatic group; a $C_6$-$C_{30}$ aromatic containing group; —OH; —$OR^{13}$ where $R^{13}$ is a $C_1$-$C_{10}$ alkyl or $C_6$-$C_{30}$ aryl, with the proviso that at least one of $R^4$, $R^5$, $R^6$, $R^9$, $R^{10}$, and/or $R^{12}$ is —OH or —$OR^{13}$;

the subscripts a, b, c, d, e, f, g, h, i, and j are zero or positive subject to the proviso that 2<a+b+c+d+e+f+g<20,000, and b+d+f>0.

19. The composition of claim 1, wherein the crosslinker is selected from an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, an imidatosilane, a ureidosilane, an isocyanatosilane, a thioisocyanatosilane, or combinations of two or more thereof.

20. The composition of claim 1 wherein the first part (A) comprises an additional component selected from water, a pigment, a filler, a thixotropic, or a combination of two or more thereof.

21. The composition of claim 1, wherein the second part (B) comprises an additional component selected from a silicone material, a pigment, a filler, or a combination of two or more thereof.

22. The composition of claim 1, wherein a mixture of part A and part B has a viscosity of from about 1,000 to about 10,000,000 cPs at 23° C. at 1 sec$^{-1}$.

23. A cured material formed from the compositions of claim 1.

24. The cured material of claim 22, wherein the silicone material has a volume resistivity of from $10^5$ to about $10^{11}$ ohm·cm.

25. The cured material of claim 23, wherein the silicone material has a thermal conductivity of about 1.0 W/m·K or less; about 0.7 W/m·K or less; or about 0.5 W/m·K.

26. The cured material of claim 23, wherein the silicone material is white in color having a L* value of about 80 or greater.

27. The cured material of claim 23, wherein the cured material is an adhesive, sealant, or coating.

28. A method of forming a cured material comprising combining the first part (A) and the second part (B) of claim 1 and exposing the resulting mixture to moisture.

* * * * *